2,871,253
ADDITION OF PARTIAL OXIDATION PRODUCT TO HYDROCARBON SYNTHESIS

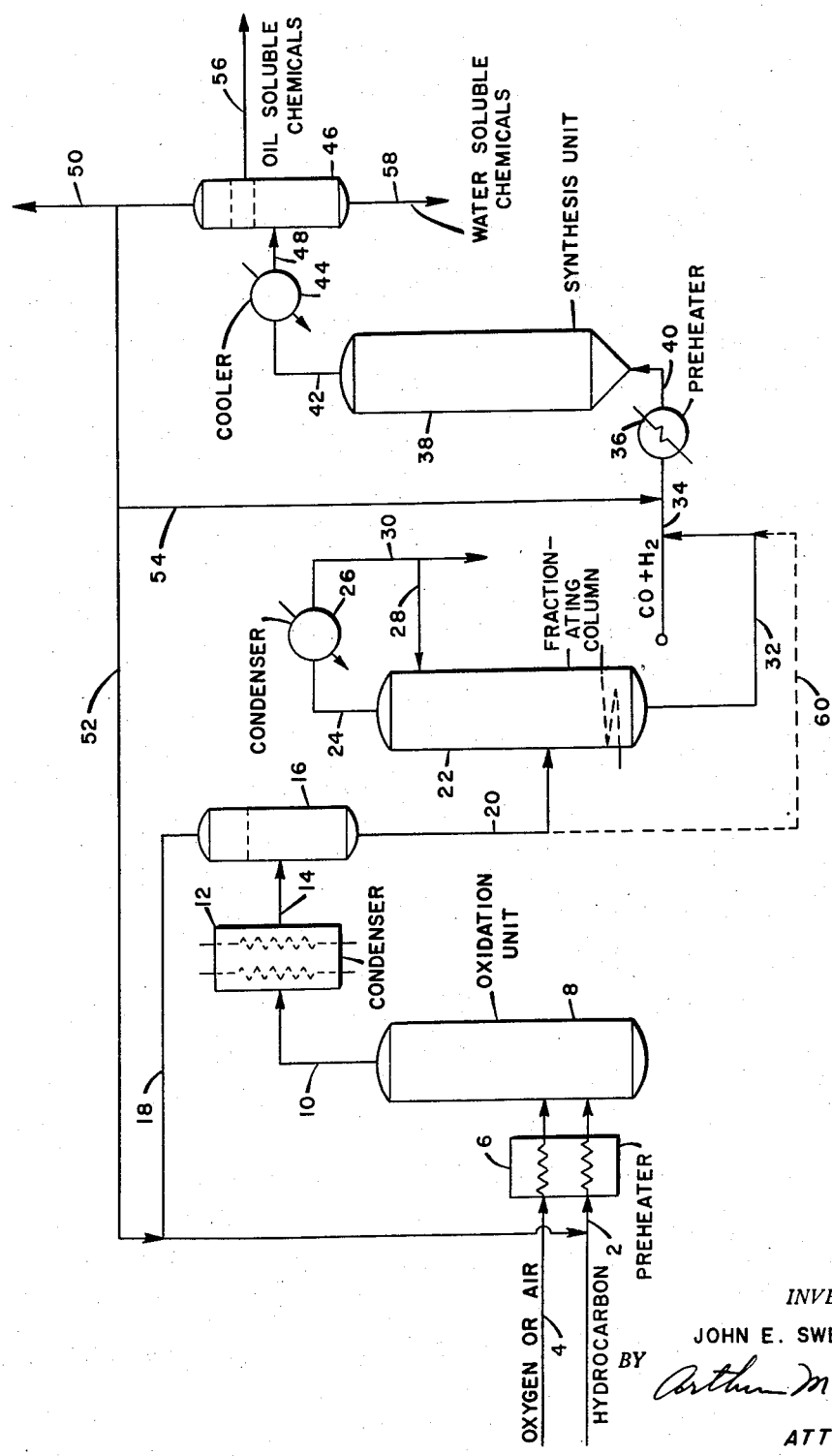

John E. Swearingen, Glenview, Ill., assignor to Pan American Petroleum Corporation, a corporation of Delaware Application March 7, 1955, Serial No. 492,445

5 Claims. (Cl. 260—449.6)

The present invention relates to a novel procedure for conducting hydrocarbon synthesis by the reduction of carbon monoxide with hydrogen. More particularly, it is concerned with a method for conducting such a synthesis in combination with a process for the partial oxidation of light hydrocarbons whereby products from the latter process may be converted into more economically desirable materials.

In conventional methods for the partial oxidation of light hydrocarbons, the distribution of products is generally found to be about 30 to 35 percent alcohols, approximately 60 to 65 percent carbonyls (aldehydes and ketones, including cyclic ethers, acetals and ketals) and from about 1 to 2 percent of water-soluble aliphatic acids. Ordinarily, the alcohol fraction thus produced is considered more desirable, and, accordingly, the carbonyl fraction is preferably given an additional treatment, such as reduction with hydrogen, to convert the aforesaid carbonyl compounds to alcohols. In order to convert the ketals and acetals to alcohols, however, they must first be subjected to an acid hydrolysis step whereby the original alcohol and aldehyde or ketone are regenerated after which the aldehyde or ketone may be reduced to its corresponding alcohol. While such a procedure serves to convert the major portion of the carbonyl compounds produced by the partial oxidation of light hydrocarbons into alcohols, it is apparent that a sizable quantity of additional equipment must be employed solely for the recovery of the aforesaid less desirable products in the form of alcohols.

I have now discovered that by operating a hydrocarbon synthesis plant in combination with a partial oxidation unit wherein products of the latter are mixed with the feed to the hydrocarbon synthesis reactor, the overall quantity of alcohols (both water- and oil-soluble) thus obtained is substantially greater than that secured either by hydrocarbon synthesis alone or from a separate process involving partial oxidation of light hydrocarbons. At the same time, the quantity of carbonyl compounds recovered by the process of my invention is substantially less than that produced in a conventional partial oxidation process.

In carrying out a preferred embodiment of my invention, a suitable light hydrocarbon, such as for example butane or propane, is first preheated to a temperature of about 650° F. Air is also preheated in a separate stream to approximately the same temperature. The resulting hot gases are then fed into a suitable reactor where rapid partial oxidation of the hydrocarbon occurs. The product gases are thereafter suitably quenched by means of any of a number of known methods and after the quenched products are chilled still further in a condenser they are taken to a separator. Here, uncondensed gases are removed from the system and the resulting aqueous mixture which may contain from about 5 to about 65 percent chemicals, depending upon the particular quenching method employed, is made ready for use in the process of my invention. Thus, the aforesaid aqueous mixture may be further concentrated, prior to introduction into the hydrocarbon synthesis reactor, by distillation up to a temperature of about 190° to 195° F. to remove alcohols and most of the carbonyls, leaving a residue consisting principally of formaldehyde which is thereafter fed into the reactor. If desired, the aforesaid distillation step may be eliminated, particularly where the concentration of chemicals in the original aqueous product is relatively high, i. e., from about 50 to 65 percent. Mixtures of partial oxidation products having such concentrations may be injected directly with the carbon monoxide and hydrogen feed in the hydrocarbon synthesis reactor to obtain a favorable shift in classes of chemicals present in the final synthesis product stream. A third alternative comprises injecting the overhead from the above-mentioned distillation step with the hydrocarbon synthesis feed of which a fraction contains a comparatively high percentage of undesirable carbonyl compounds, excluding formaldehyde, which on injection into the hydrocarbon synthesis reactor in accordance with the provisions of my invention results in a more favorable distribution of chemicals in the synthesis product stream than is normally otherwise secured.

The hydrocarbon synthesis operation conducted in combination with the above-mentioned oxidation step in accordance with my invention may be effected under conditions now well known to the art. Generally, however, I prefer to employ a fluidized bed of alkali-promoted iron catalyst, although operation of the process of my invention using a fixed bed of catalyst is also contemplated. The reactants, including the chemicals derived from the partial oxidation step, are preheated to a temperature at least sufficient to vaporize said chemicals prior to introduction thereof into the synthesis reactor. Usually preheat temperatures of the order of 250° to 300° F. will be found satisfactory. The synthesis reactor is operated at temperatures ranging from about 575° to about 700° F., preferably at a temperature of from about 600° to 650° F., although lower or slightly higher temperatures may be used. Reactor pressure of 125 to about 500 pounds may be used; however, I generally prefer pressures of from about 300 to about 450 pounds. Other operating conditions typical of those which may be employed include a space velocity of from about 3 to about 5 S. C. F. H. CO per pound iron catalyst fluidized, a recycle ratio of about 1.2 to about 1.7, and a $H_2$:CO ratio ranging from about 1.5:1 to about 2.0:1. The quantity of chemicals injected with the synthesis feed may vary within relatively wide limits depending at least partially upon the nature of the partial oxidation chemical or chemicals to be introduced. In general, however, I prefer to employ these chemicals from the aforesaid partial oxidation step in the synthesis total feed within a concentration range of from about 0.25 to about 5.0 mol percent, for example, from about 0.5 to about 1.0 mol percent.

The term light hydrocarbon, as used herein, may be construed to mean hydrocarbons having from 1 to 8 carbon atoms. Generally, for economic reasons, it is preferable to employ in the process of my invention hydrocarbons having from 1 to 4 carbon atoms.

The process of my invention may be further illustrated by reference to the accompanying flow diagram wherein a suitable light hydrocarbon and air or oxygen are separately introduced through lines 2 and 4 respectively into preheater 6 where these streams are preheated to a temperature of about 650° F. after which they are led into partial oxidation reactor 8 and allowed to react at temperatures ranging from about 800° to about 1000° F. This reaction is quite rapid and after the products of partial oxidation are formed, they are withdrawn through line 10 and quenched in a cold surface condenser 12 which is operated at a temperature of about 60° to 80° F. The resulting liquid products are then taken together with condensed gases through line 14 to separator 16. The aforesaid gases may be withdrawn overhead through line 18 and returned to reactor 8 via line 2. The product water layer which contains from 60 to 65 percent chemicals is then withdrawn through line 20 and sent to fractionating column 22 where the bulk of the water present is removed overhead together with the alcohols and some of the carbonyl compounds through line 24 and condenser 26. A portion of the overhead is refluxed to the column through line 28 while the remainder of the distillate is withdrawn from the system through line 30 and the chemicals present therein recovered and purified in accordance with methods outside the scope of my invention. The bottoms product in column 22, which consists chiefly of formaldehyde together with a relatively small amount of carboxylic acids, is taken through line 32 where it is combined with hydrogen and carbon monoxide in line 34 and the resulting mixture passed through preheater 36 where its temperature is increased to approximately 250° F. This preheated mixture is next introduced into hydrocarbon synthesis reactor 38 through line 40. The catalyst employed in reactor 38 is finely divided iron mill scale promoted with about 0.8 weight percent of K₂O. The reaction mixture thus introduced is subjected to a temperature of about 650° F., at a pressure of about 375 pounds and a space velocity of 4.5 S. C. F. H. CO per pound iron fluidized with a recycle ratio of 1.5 being employed. The catalyst is maintained in a fluidized state by introducing the feed at a linear velocity of about .6 foot per second. Overhead product gases withdrawn through line 42 are condensed in cooler 44 after which they are transferred to separator 46 through line 48. A portion of the uncondensed product gases may be vented to the atmosphere through line 50 or a portion thereof may be returned to line 18 through line 52 to serve as a source of hydrocarbon feed for partial oxidation unit 8. Recycle of synthesis tail gas to reactor 38 is effected through line 54. A liquid oil layer is withdrawn from separator 46 through line 56 while the lower aqueous product layer is removed through line 58. An analysis of both the oil and water streams in lines 56 and 58 respectively indicate an increase in the alcohol content of the water layer of about 55 to 60 percent and an increase in the alcohol content of the oil layer of about 35 percent over that which is ordinarily secured in conventional hydrocarbon synthesis. Instead of subjecting the aqueous mixture in separator 16 to further concentration, it may be transferred directly via dotted line 60 and introduced into reactor 38 directly with the carbon monoxide and hydrogen in line 34.

The process of my invention is further illustrated by the following specific example:

*Example*

In the runs described below, a conventional hydrocarbon synthesis operation is first carried out to demonstrate the quantity and distribution of oil-soluble and water-soluble chemicals normally obtained. The second run employs the feature of my invention comprising adding products of partial oxidation to hydrocarbon synthesis total feed. The third run differs from the second in that formladehyde resulting from the partial oxidation of butane is used alone, instead of the primary water from the partial oxidation of light hydrocarbons. The conditions employed in each of these runs are described below. In Run No. 1, hereafter referred to as "normal synthesis," the procedure is as follows: Fresh feed having an H₂:CO ratio of 1.85 is introduced into a synthesis reactor containing a finely divided alkali-promoted iron mill scale catalyst. Catalyst is fluidized by injecting the feed at a linear velocity of about 0.5 foot per second and under these conditions, the quantity of catalyst present is such that the space velocity is about 4.0 S. C. F. H. (CO) total feed per pound iron fluidized. The temperature and pressure of the reaction zone during synthesis are 650° F. and 400 p. s. i., respectively. The recycle ratio employed varies from 1 to 2. In Run No. 2, primary water from the partial oxidation of butane containing 60 percent chemicals is first preheated to a temperature of about 250° F. and mixed with feed to a synthesis operation employing the same conditions as described in Run No. 1. The chemicals are added to the synthesis feed in an amount sufficient to give a concentration of 0.4 mol percent in the total feed to the synthesis unit. Run No. 3 is operated under the same conditions as Run No. 2 except that gaseous formaldehyde instead of partial oxidation primary water is added to the feed gas in a concentration of about 0.5 mol percent. In all runs, the total feed CO conversion is in excess of 90 percent. The results obtained in Runs 1, 2 and 3 are indicated below.

| Selectivity of CO converted, percent | Normal synthesis | Primary water chemicals (net [1]) | Formaldehyde (net [1]) |
|---|---|---|---|
| Water-soluble chemicals | 7.5 | 6.3 | 8.2 |
| Ethanol | 2.3 | 4.2 | 3.9 |
| 1-propanol | 0.9 | 1.1 | 1.2 |
| Water soluble alcohols (total) | 3.7 | 5.9 | 5.9 |
| Oil soluble chemicals | 9.5 | 10.3 | 8.9 |
| Oil soluble alcohols (total) | 3.3 | 4.8 | 4.3 |

[1] Net=total chemicals minus chemicals in feed to synthesis reactor.

From the foregoing description, it will be apparent to those skilled in the art that by the present invention it is now possible to utilize, to advantage, the various less desirable products obtained by the partial oxidation of light hydrocarbons. Thus, it is seen that by the process of my invention, the percentage of total alcohols produced during hydrocarbon synthesis may be increased as much as 50 to 55 percent. Likewise, the desirability of operating a hydrocarbon synthesis plant in combination with a partial oxidation unit will be readily apparent not only because the present invention teaches a method for converting less desirable products of partial oxidation into materials of greater value, but because, by operating the two types of plants together, the synthesis plant is capable of supplying a source of hydrocarbon feed for the partial oxidation unit. Also because the separation and purification equipment is already installed for the purpose of handling hydrocarbon synthesis product chemicals, no additional equipment is required for processing the chemicals produced as a result of the partial oxidation step. Accordingly, it is seen that the two procedures discussed herein, when employed in combination as taught by my invention, tend to supplement one another.

I claim:

1. In a process for effecting the synthesis of hydrocarbons by the reaction of carbon monoxide with hydrogen in a synthesis zone at temperatures of from about 600° to about 650° F. and under other known conditions including the use of an alkali promoted iron hydrocarbon synthesis catalyst, the improvement which comprises first effecting the partial oxidation of a light hydrocarbon, recovering an aqueous product containing alcohols and carbonyl compounds as a result of said partial oxidation, subjecting said product to distillation up to a temperature of about 190° to 195° F. to obtain an aqueous bottoms fraction comprising essentially formaldehyde and water-soluble aliphatic acids, mixing said bottoms with carbon monoxide and hydrogen in an amount sufficient to give a concentration of from about 0.25 to about 5.0 mol percent in the total synthesis feed, said carbon monoxide and hydrogen being present in the resulting mixture in synthesis proportions, continuously injecting said resulting mixture in the vapor phase into a hydrocarbon synthesis zone in the presence of a fluidized bed of an iron hydrocarbon synthesis catalyst under synthesis conditions and recovering from said zone a product mixture comprising hydrocarbons, water and oxygenated organic compounds, including alcohols.

2. The process of claim 1 in which said bottoms is mixed with carbon monoxide and hydrogen in an amount sufficient to give a concentration of from about 0.5 to about 1.0 mol percent in the total synthesis feed.

3. In a process for effecting the synthesis of hydrocarbons by the reaction of carbon monoxide with hydrogen in a synthesis zone at temperatures of from about 575° to about 700° F., and under other known conditions, including the use of an alkali-promoted hydrocarbon synthesis catalyst, the improvement which comprises adding to a hydrocarbon synthesis reaction mixture containing principally carbon monoxide and hydrogen in synthesis proportions, formaldehyde from the partial oxidation of a light hydrocarbon in an amount such as to give a concentration of said product in the synthesis total feed of from about 0.25 to about 5.0 mol percent, thereafter subjecting the resulting mixture to said known synthesis conditions, and continuing the addition of said formaldehyde throughout said synthesis.

4. In a process for the synthesis of hydrocarbons by the reaction of carbon monoxide with hydrogen in a synthesis zone at temperatures of from about 575° to about 700° F. and under other known conditions including the use of an alkali-promoted iron hydrocarbon synthesis catalyst, the improvement which comprises first effecting the partial oxidation of a light hydrocarbon to produce a product water layer containing water-soluble chemicals including formaldehyde, mixing said product water layer with carbon monoxide and hydrogen in an amount sufficient to give a concentration of from about 0.25 to about 5.0 mol percent in the total synthesis feed, said carbon monoxide and hydrogen being present in the resulting mixture in synthesis proportions, thereafter subjecting the resulting mixture to said known synthesis conditions, and continuing the addition of said product layer during said synthesis.

5. The process of claim 4 in which the catalyst is employed in the form of a fluidized bed.

References Cited in the file of this patent

UNITED STATES PATENTS

| | | |
|---|---|---|
| 1,996,101 | Dreyfus | Apr. 2, 1935 |
| 2,000,096 | Prudhomme | May 7, 1935 |
| 2,345,957 | Wirth et al. | Apr. 4, 1944 |
| 2,590,124 | Reeder | Mar. 25, 1952 |
| 2,670,378 | Frye | Feb. 23, 1954 |
| 2,810,739 | Lake et al. | Oct. 22, 1957 |